US006640931B2

(12) United States Patent
Palmer et al.

(10) Patent No.: US 6,640,931 B2
(45) Date of Patent: Nov. 4, 2003

(54) UNIVERSAL, HAND ATTACHABLE, MULTI-USE, L-SHAPED, LADDER UTILITY BRACKET, WITH LADDER LEVELER ATTACHMENT

(76) Inventors: R. Park Palmer, 45 Olney St., Providence, RI (US) 02906; Cornelia G. Palmer, 130 Grotto Ave., Providence, RI (US) 02906; R. Park Palmer, Jr., 130 Grotto Ave., Providence, RI (US) 02906

( * ) Notice: Subject to any disclaimer, the term of this patent is extended or adjusted under 35 U.S.C. 154(b) by 0 days.

(21) Appl. No.: 09/777,485

(22) Filed: Feb. 5, 2001

(65) Prior Publication Data

US 2003/0034207 A1 Feb. 20, 2003

Related U.S. Application Data

(60) Provisional application No. 60/180,260, filed on Feb. 4, 2000.

(51) Int. Cl.$^{7}$ .......................... E06C 1/00; F16M 11/24

(52) U.S. Cl. .................... 182/203; 182/200; 248/188.4; 248/188.2

(58) Field of Search ................................ 182/200–204, 182/205; 248/188.2–188.5, 539, 540, 295.11, 227.3

(56) References Cited

U.S. PATENT DOCUMENTS 1,272,551 A * 7/1918 Smith ........................ 182/205
2,318,017 A * 5/1943 Schmidt ................. 182/201 X
2,578,826 A * 12/1951 Mrofka ................ 248/188.4 X
2,890,824 A * 6/1959 Derby et al. ................ 182/202
3,841,663 A * 10/1974 Proffit ................. 248/188.4 X
4,069,893 A * 1/1978 Blackstone ................. 182/200
4,090,586 A * 5/1978 Pears ......................... 182/204
4,209,078 A * 6/1980 Gerber ....................... 182/203
4,744,441 A * 5/1988 Sandstrom .............. 182/201 X
4,792,017 A * 12/1988 Grove ........................ 182/204
4,836,331 A * 6/1989 Foradori ..................... 182/107
4,984,655 A * 1/1991 Scherer et al. .............. 182/204
4,995,474 A * 2/1991 Gauthier ..................... 182/201
5,121,813 A * 6/1992 Funston ...................... 182/203
5,148,892 A * 9/1992 Lu ............................. 182/201
5,154,257 A * 10/1992 Mirles ........................ 182/201
5,609,222 A * 3/1997 Horbacewicz et al. ...... 182/203
5,816,364 A * 10/1998 Christy et al. .............. 182/201

FOREIGN PATENT DOCUMENTS

GB 2124691 * 2/1984 ................. 182/107

* cited by examiner

*Primary Examiner*—Hugh B. Thompson

(57) ABSTRACT

A multi use L-shaped ladder utility bracket with ladder leveling attachments that is hand fastenable, due to four proprietarily aligned apertures in the bracket's elongated member, using two u-bolts and associated nuts, to any two rungs of any ladder with rungs that are sequentially distanced one from another by approximately 12 inches, center-point to center-point.

3 Claims, 6 Drawing Sheets

UNIVERSAL, HAND ATTACHABLE, MULTI-USE, L-SHAPED, LADDER UTILITY BRACKET, WITH LADDER LEVELER ATTACHMENT

This application claims the benefit of provisional application Ser. No. 60/180,260 filed Feb. 4, 2000.

FEDERALLY SPONSORED RESEARCH AND DEVELOPEMENT

Not Applicable

MICROFICHE APPENDIX

Not Applicable

BACKGROUND OF THE INVENTION (1) Field of the Invention

Technical Field

This invention certainly falls under U.S. patent classification #182/204, however, with its versatile holding bracket, it is also able to cross the line into many other single-use ladder related fields, and is not necessarily limited to just ladder leveling.

(2) Description of the Invention

Background Art

Many single-use ladder related inventions have been patented, such as ladder levelers, ladder hoists, ladder caddies, ladder trays, etc. Many of these inventions are part of or welded to a ladder. Some are invasively attached by drilling holes in the ladder's leg and bolting the apparatus to it. A few are non-invasively attachable to the ladder. All, however, are single use and none have a fixed universal rung attachment mechanism using two u-bolts and an L-shaped bracket with 4 apertures the alignment of which is dependent on the principal that all mass produced two legged ladders, with which this Multi-use Utility Bracket is used, have rungs that are sequentially distanced 12 inches one from the other, center-point to center-point. See Attached Field of Search.

BRIEF SUMMARY OF THE INVENTION

The "ladder utility bracket" is uniquely attachable by hand in either an upright or upside down position to any two sequential rungs of any given two legged ladder, the legs of which are connected by rungs that are sequentially 12 inches equidistant center-point to center-point. The essence or heart of the invention is the proprietary center-point to center-point location of four vertically aligned apertures set through the long side of a steel or plastic bar that is perpendicularly angled at one end to form an L shaped bracket. The specifications for these four proprietary holes are based on the principle that although ladder rungs may be quite different in diameter or width they are all set approximately 12 inches apart center-point to center-point. This aperture location formula is the key to the two rung attachability of the L-shaped bracket using two u-bolts and four (4) nuts as fasteners. The L-shaped bracket is easily rigged for multiple uses, such as ladder leveling, by adding secondary holes, secondary brackets, nuts, bolts, rods and other fittings to the L-shaped bracket.

DETAILED DESCRIPTION OF THE INVENTION

Figure 1:
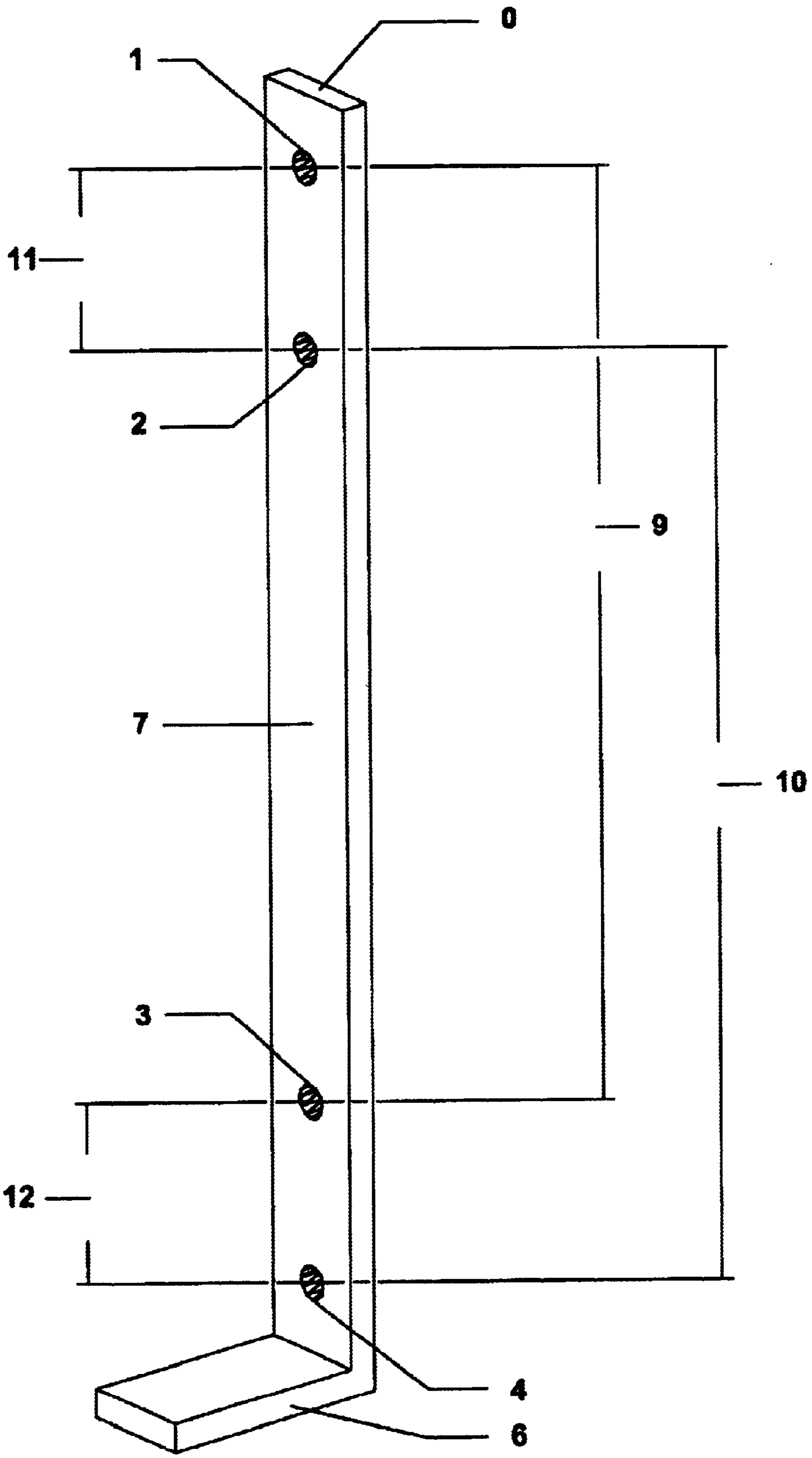
FIG. 1 depicts the L-shaped bracket with two sets of vertically aligned apertures, each aperture proprietarily spaced one from the other center-point to center-point.
Figure 2:
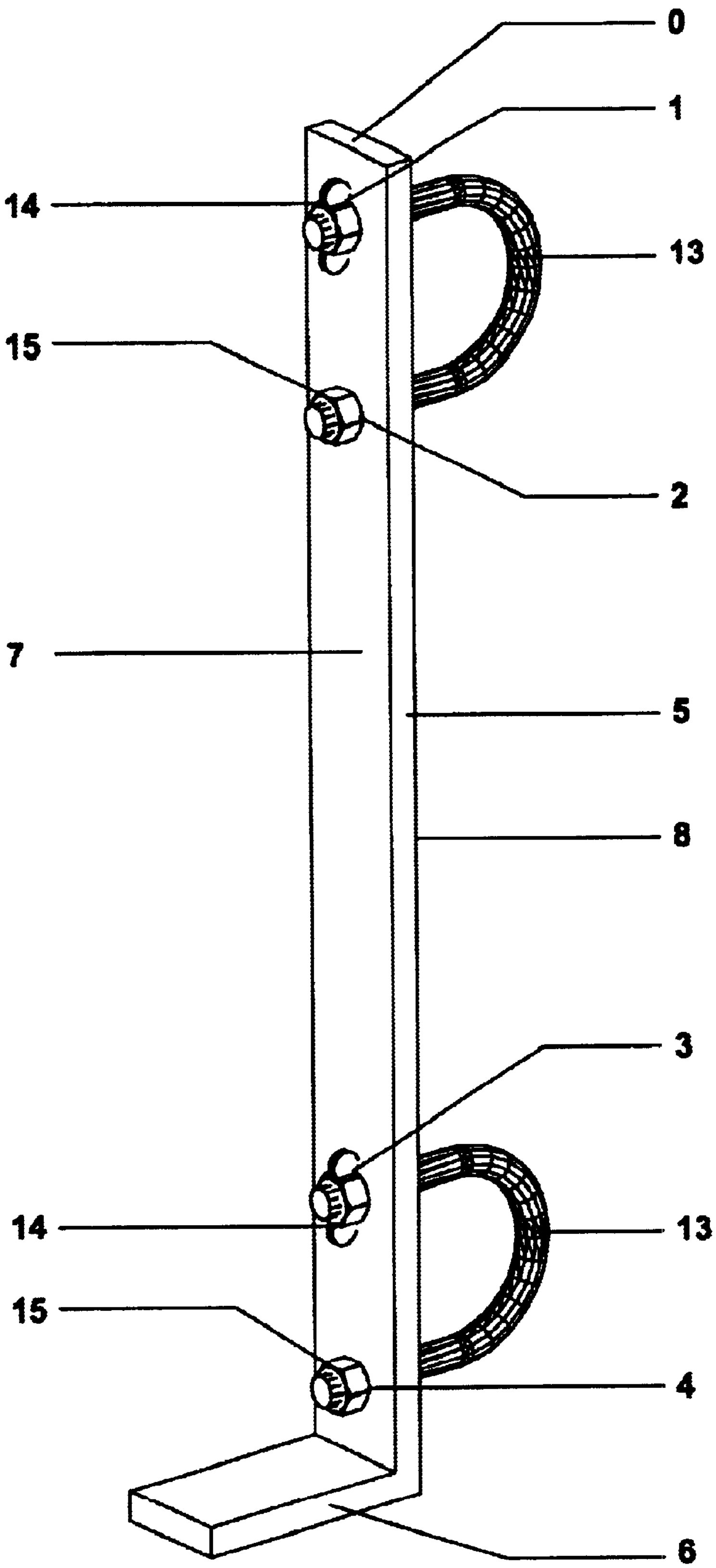
FIG. 2 depicts the L-shaped bracket in an unattached state with two u-bolt fasteners going through the two sets of vertically aligned proprietarily spaced apertures, each u-bolt with a hex and wing nut fastened to it.
Figure 3:
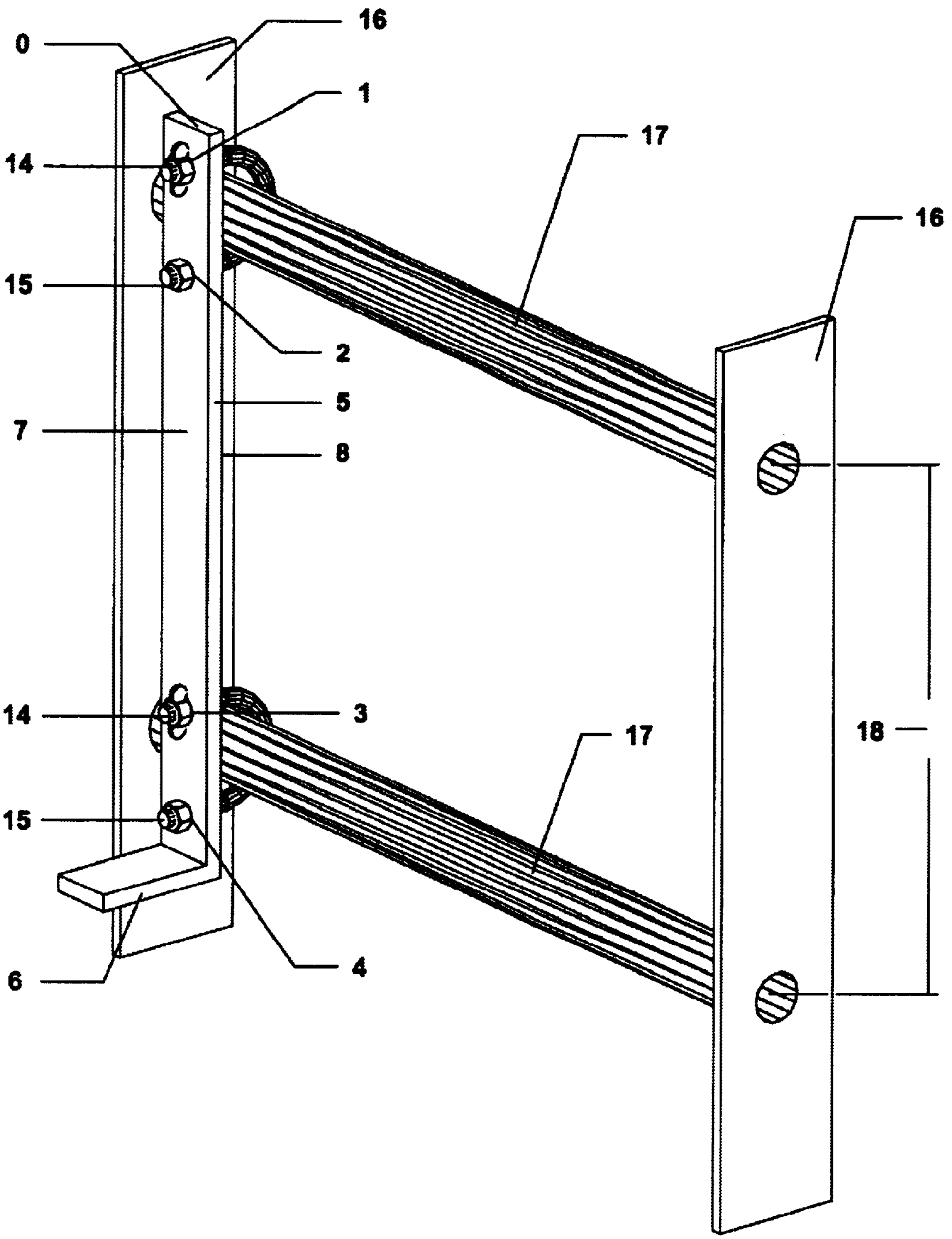
FIG. 3 depicts the L-shaped bracket attached to two sequential ladder rungs of a two-legged ladder using two u-bolts that have been placed around the adjacent rungs that are approximately 12 inches apart center-point to center-point, and then through two sets of correspondingly proprietarily spaced apertures in the L-shaped bracket which is tightly hand fastened to the two rungs of the ladder by a hex and wing nut located at the end of each u-bolt.
Figure 4:
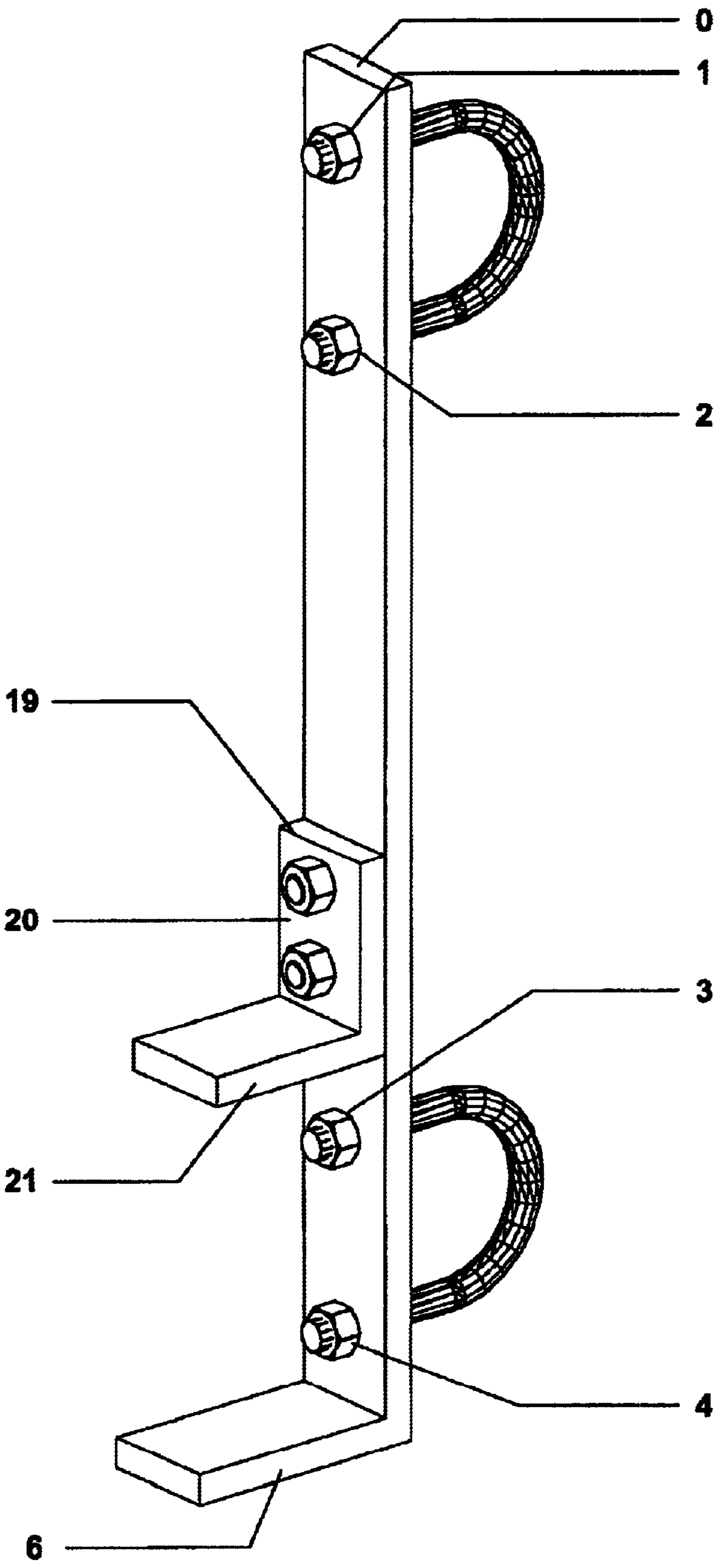
FIG. 4 depicts the L-shaped bracket with a secondary bracket, the first or vertical leg of which is welded or bolted to the elongated side of the L-shaped bracket between the second and third apertures.
Figure 5:
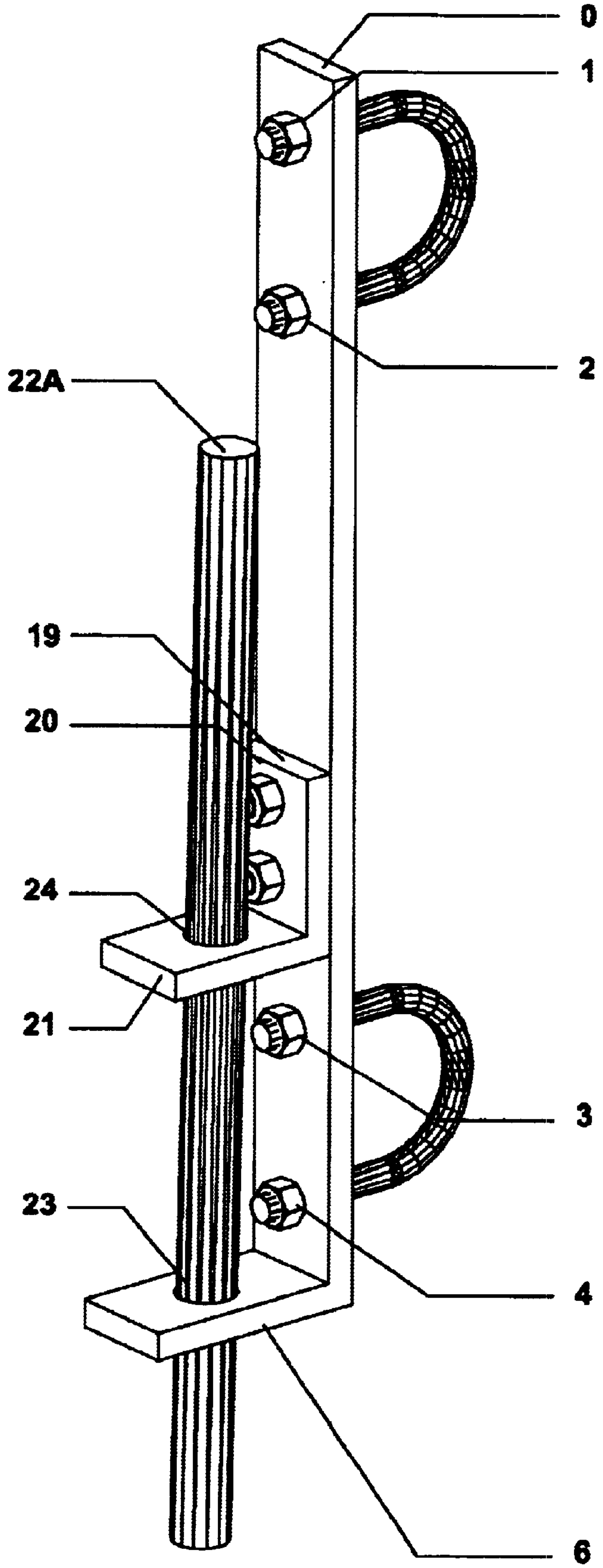
FIG. 5 depicts FIG. 4 with a steel or plastic rod received through two aligned apertures, the first of said aligned apertures in the short side of the L-shaped bracket and the second of said aligned apertures in the horizontal leg of the secondary bracket that is attached to the L-shaped bracket.
Figure 6:
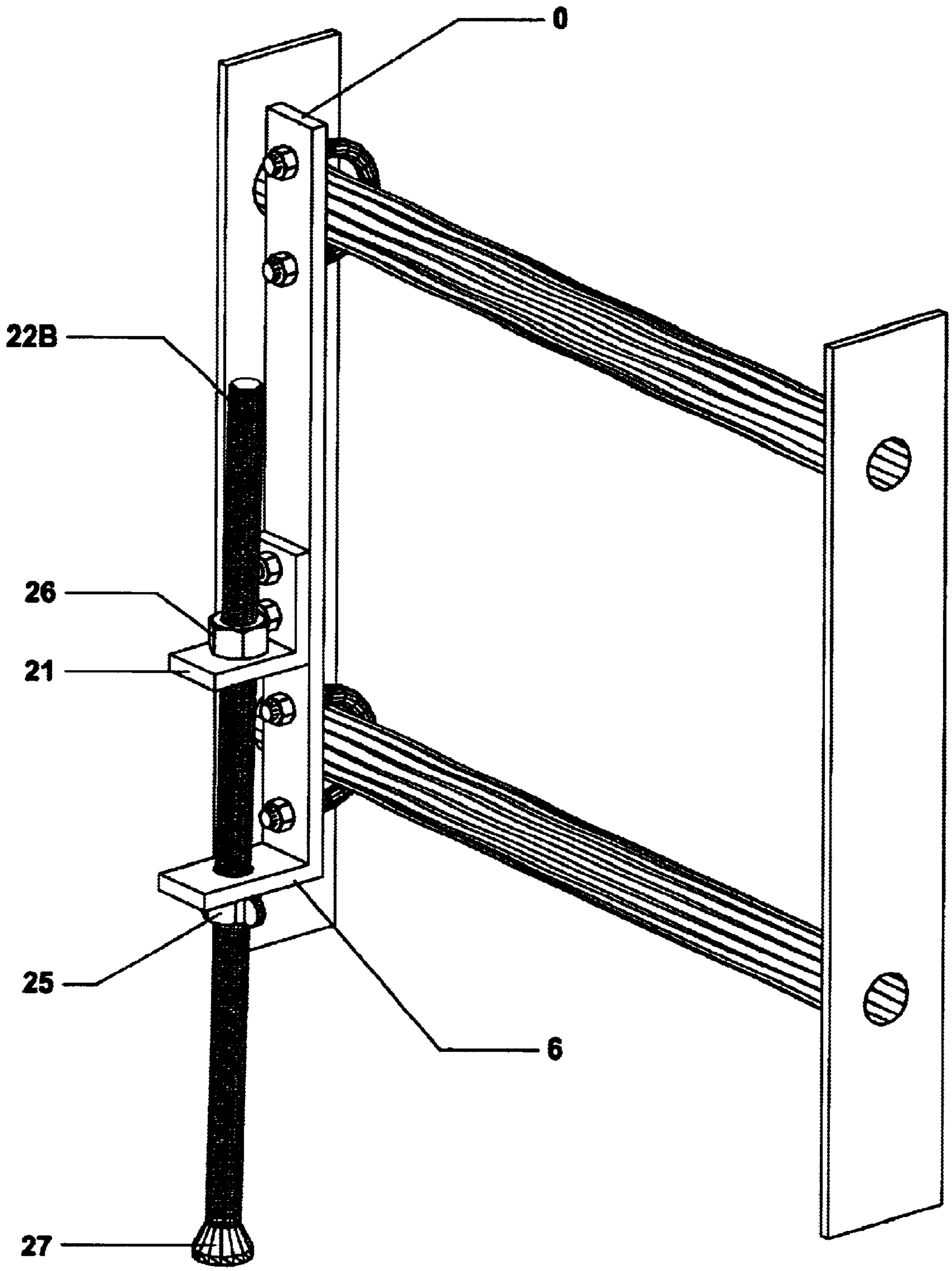
FIG. 6 depicts FIGS. 3, 4 and 5 with a steel or plastic threaded rod replacing the steel or plastic rod, two wing or hex nuts used to secure the threaded rod to the utility bracket, one tightened against the short side of the L-shaped bracket, the other tightened against the horizontal leg of the secondary bracket, and a rubberized non skid tip attached to the bottom end of the threaded rod.

Best Mode for Carrying out the Invention

The invention is a non-invasive multi-use L-shaped utility bracket that is uniquely hand attachable, using two u-bolts as fasteners, in either an upright or upside down position to any two sequential rungs of any given two legged ladder, the legs of which are connected by rungs each being sequentially distanced from the next by approximately 12 inches, center point to center point: the "Standard Two-Legged Ladder."

This L-shaped utility bracket is easily rigged for multiple uses, such as ladder leveling by adding secondary holes, secondary brackets, nuts, bolts, rods, and other fittings to the L-shaped bracket.

There are three basic components and three basic steps involved in hand attaching the L-shaped bracket to the left inside, right inside or anywhere in between of any given "Standard Two-Legged Ladder". The components are:

1. Two identical off-the-shelf u-bolts with a preferred diameter of not less than 0.375 inches. The u-bolts must have poles long enough and a span between poles wide enough so that each u-bolt can fit loosely around the largest "Standard Two-Legged Ladder" rung (not less than 2.675 inches by not less than 2 inches is the preferred dimensional solution).

2. Each u-bolt comes with one hex nut and one wing nut which is necessary for hand tightening.

3. One metal or plastic bar of not less than 1.5 inches in width and not less than 0.375 inches in depth (preferred) that is perpendicularly angled to ninety degrees at one end forming an L-shaped bracket. The preferred outside dimension of the elongated member of the L-shaped bracket being at least 14.375 inches and the preferred inside dimension of the short side of the L-shaped bracket being at least 1 inch.

The multi position attachment capability of the of invention is dependent on two sets of vertically aligned apertures that pass through the elongated member of the L-shaped bracket. Each set of apertures must be able to loosely accommodate the above described u-bolts. Therefore, the center-points of the two adjacent apertures comprising each set of apertures in the elongated member of the L-shaped bracket, i.e apertures (#1 and #2) and (#3 and #4) must be distanced one from the other by a distance equal to the inside measurement between the two above u-bolt poles plus the diameter of an above u-bolt pole or not less than 2 inches. In addition, so that the two u-bolts can be placed around the rungs of a "Standard Two-Legged Ladder" and then fit easily through the two aligned sets of holes set in the elongated member of the L-shaped bracket, the center-point distance of the first aperture in the series of four apertures comprising the two sets of vertically aligned apertures set in the elongated member of the L-shaped bracket, no matter whether the short side of the L-shaped bracket is pointed in an upward or downward position, must be distanced from the center point of the third aperture in the series by a center-point to center-point distance equal to the center-point to center-point distance between two adjacent ladder rungs of a "Standard Two-Legged Ladder" or approximately 12 inches. Finally, the center point of the second aperture in the elongated member of the L-shaped bracket must be distanced from the center point of the fourth aperture in the series by a distance equal to the center-point to center-point measurement between holes one 1 and 3 or approximately 12 inches.

The center-point to center-point measurements are key because they permit the attachment of the L-shaped bracket to any given "Standard-Two Legged Ladder", the rungs of which may vary substantially in diameter or width.

The process for fastening the "Ladder Utility Bracket" #0 anywhere on the inside of a "Standard Two Legged Ladder" involves three basic steps:

1. Each U bolt #13 is placed around each of two adjacent standard ladder rungs #17 either on the left side, the right side or anywhere in between.

2. The two ends of each U bolt #13 are then passed through each correspondingly aligned set of holes #1, 2 and 3, 4 in the "Ladder Utility Bracket" #0. The short side of the L-shaped bracket #6 may be pointed either up or down depending on the use desired. For ladder leveling it is pointed down 3. A hex nut #15 and wing nut #14 are attached to the poles of each u-bolt #13 and then hand tightened against the front side #7 of the L-shaped bracket #0 pressing and locking its vertical backside #8 tightly against the two adjacent ladder rungs #17 around which the two u-bolts #13 have been placed.

Rigging the L-shaped bracket for ladder leveling requires drilling an aperture #23 in the short side of the L-shaped bracket #6 and adding the below 5 secondary attachments:

1. A secondary bracket #19 with an aperture #24 through its horizontal second leg #21, the secondary bracket #19 attached by weld or bolts to #5 between #2 and #3 with the clearance of a wing nut between #21 and #3.

1B. A rod #22A with a diameter of about 0.75 inches, not necessary for ladder leveling, but could be used as a measuring rod.

2. A threaded rod #22B with a diameter of about 0.75 inches.

3. A wing nut #25

4. A hex nut #26

5. A rubberized non skid tip #27

When rigged for ladder leveling on stairs and inclines, the threaded "level" rod #22B is dropped through the aligned apertures #24 and #23 of the assembled L-shaped and secondary brackets #0 and #19. The L-shaped bracket being attached to the end of the bottom two rungs #17 against the non-elevated (downhill) leg of the ladder #16. The threaded "level" rod is then extended until it raises the leg on the downhill side of the ladder to the level of the leg on the uphill side of the ladder.

When the ladder is in this level upright position the threaded rod is set in place by a wing nut that is tightened upward against the short side of the L-shaped bracket #6 and, for further optional stability, a hex nut may be tightened downward against the horizontal second leg of the secondary bracket #21.

An off the shelf screw on non skid tip attaches to the bottom or ground side of the threaded rod #22B for further stability.

DRAWINGS REFERENCE NUMBERS

0=the hand attachable L-shaped ladder utility bracket.

1=the first proprietary centrally aligned aperture in the L-shaped racket.

2=the second proprietary centrally aligned aperture in the L-shaped bracket".

3=the third proprietary centrally aligned aperture in the L-shaped bracket.

4=the fourth proprietary centrally aligned aperture in the L-shaped bracket.

5=the elongated member of the metal or plastic bar that forms the L-shaped.

6=the short side of the metal or plastic bar that forms the L-shaped bracket.

7=the front side of the elongated member of the L-shaped bracket.

8=the back side of the elongated member of the L-shaped bracket.

9=the proprietary center-point to center-point distance between the first aperture in the elongated member of the L-shaped bracket #5 and the third aperture in the elongated member of the L-shaped bracket #5, about 12 inches.

10=the proprietary center-point to center-point distance between the second aperture in the elongated member of the L-shaped bracket #5 and the fourth aperture in the elongated member of the L-shaped bracket #5, about 12 inches.

11=the proprietary center-point to center-point distance between the first aperture #1 in #5 and the second aperture #2 in #5, which is equal to the inside measurement between u-bolt poles plus the diameter of one u-bolt pole or not less than two inches.

12=the proprietary center-point to center-point distance between the third aperture #3 in #5 and the fourth aperture #4 in #5, which is equal to the inside measurement between u-bolt poles plus the diameter of one u-bolt pole or not less than 2 inches.

13=two off-the-shelf u-bolts, the ends of which go through holes (1 and 2) and (3 and 4).

14=two off-the-shelf wing nuts that can be fastened to either u-bolt.

15=two off-the-shelf hex nuts that can be fastened to either u-bolt.

16=a vertical ladder leg that is connected to a second leg by sequentially equidistant horizontal rungs.

17=a horizontal ladder rung that is sequentially equidistant from the next rung and holds together the two legs of the ladder.

18=the distance between two sequentially equidistant ladder rungs center-point to center-point, about 12 inches.

19=a secondary bracket which may be welded or bolted to the elongated member of the L-shaped bracket #5 between the second and third apertures with at least the clearance of a wing nut between #21 and #3.

20=the first leg of the secondary bracket #19 having an inside vertical dimension of about 2 inches.

21=the horizontal second leg of the secondary bracket #19 having an inside dimension of at least 2 inches.

22A=a steel or plastic rod with a diameter of about 0.75 inches.

22B=a steel or plastic threaded rod with a diameter of about 0.75 inches.

23=an aperture in the short side #6 of the L-shaped bracket that is adapted to receive a rod #22A or threaded rod #22B that is about 0.75 inches in diameter and is aligned with an aperture in the horizontal leg of the secondary bracket #24.

24=an aperture in the horizontal leg of the secondary bracket that is adapted to receive a rod #22A or threaded rod #22B that is about 0.75 inches in diameter and is aligned with the aperture in the short side of the L-shaped bracket #6.

25=a wing nut adapted to secure a threaded rod about 0.75 inches in diameter to the L-shaped bracket by tightening it against the short side of the L-shaped bracket #6.

26=a hex nut adapted to secure a threaded rod #22B about 0.75 inches diameter to the assembled utility bracket by tightening it against the horizontal leg of the secondary bracket #21.

27=a rubberized non skid tip adapted to attach to the end of a 0.75 inch diameter threaded rod #22B.

What is claimed is:

1. A non invasive hand attachable utility bracket system having two u-bolts and four matching hex or wing nuts for use with ladders having a pair of vertical legs connected by rungs that are sequentially distanced about 12 inches, center-point to center-point, wherein the utility bracket system is comprised of both a primary and secondary bracket, where in the primary bracket comprises:

a) an L-shaped bracket formed from steel or plastic that is about 1.5 inches in width and about 0.375 inches in depth; wherein the L-shaped bracket has an elongated member with an outside dimension of at least 14.375 inches and a short side with an inside dimension of at least 1 inch;

b) four centrally aligned apertures through the elongated member of the L-shaped bracket with a diameter sufficient to receive said u-bolts, each of said u-bolts having a pole diameter of about 0.375 inches; wherein a first of said apertures is set not less than 2 inches, center-point to center-point, from a second of said apertures, and about 12 inches, center-point to center-point, from a third of said apertures, and wherein the second of said apertures is set about 12 inches from a fourth of said apertures, center-point to center-point, and the fourth of said apertures is set not less than 2 inches from the third of said apertures center-point to center-point;

c) each of said u-bolts having a distance between poles of not less than 2 inches, center-point to center-point, and adapted to engage respective sequential ladder rungs, and aligned so as to pass easily through respective apertures in the elongated member of the L-shaped bracket and securely bolt the two sequential ladder rungs to the L-shaped bracket with the four hex or wing nuts;

wherein the secondary bracket comprises:

a bracket having two legs that are perpendicular to one another with a vertical first leg having an inside dimension of about 2 inches and a horizontal second leg having an inside dimension of at least 2 inches, the vertical leg of the secondary bracket being attached to an inner side of the elongated member of the L-shaped bracket between the second and third of said apertures.

2. The bracket system of claim 1, further comprising a steel or plastic rod with a diameter of about 0.75 inches adapted to be received through two aligned apertures, a first of said aligned apertures in the short side of the L-shaped bracket and a second of said aligned apertures in the horizontal leg of the secondary bracket that is attached to the inner side of the L-shaped bracket.

3. The bracket system of claim 1, further comprising a steel or plastic threaded rod with a diameter of about 0.75 inches, adapted to be received through two aligned apertures, a first of said aligned apertures in the short side of the L-shaped bracket and a second of said aligned apertures in the horizontal leg of the secondary bracket that is attached to the L-shaped bracket; two additional wing or hex nuts used to secure the threaded rod to both the L-shaped and secondary brackets against a bottom of the short side of the L-shaped bracket, and against a top of the horizontal leg of the secondary bracket; and a rubberized tip attached to a lower end of the threaded rod.

* * * * *